United States Patent
Scola (10) Patent No.: US 7,581,903 B1
(45) Date of Patent: Sep. 1, 2009

(54) METHOD OF MANUFACTURE AND INSTALLATION FLOWABLE THERMAL BACKFILLS

(75) Inventor: Angelo A. Scola, Palo Alto, CA (US)

(73) Assignee: Thermoforte, Inc., Providence, RI (US)

( * ) Notice: Subject to any disclaimer, the term of this patent is extended or adjusted under 35 U.S.C. 154(b) by 161 days.

(21) Appl. No.: 11/450,626

(22) Filed: Jun. 8, 2006

(51) Int. Cl.
*F16L 59/15* (2006.01)

(52) U.S. Cl. ........................ 405/157; 405/179

(58) Field of Classification Search ............... 405/179, 405/157, 155, 154.1, 130, 131
See application file for complete search history.

(56) References Cited

U.S. PATENT DOCUMENTS

| | | | |
|---|---|---|---|
| 3,026,094 A | | 3/1962 | True |
| 3,082,111 A | | 3/1963 | Maddison et al. |
| 3,669,418 A | | 6/1972 | Cornwell |
| 3,719,511 A | * | 3/1973 | Bevard et al. ............... 106/724 |
| 4,050,258 A | * | 9/1977 | Brewer et al. ............ 405/258.1 |
| 4,050,261 A | * | 9/1977 | Brewer et al. ............ 405/258.1 |
| 4,062,195 A | * | 12/1977 | Brewer et al. ............ 405/154.1 |
| 4,177,078 A | * | 12/1979 | Welna et al. ............... 405/130 |
| 4,298,288 A | | 11/1981 | Weisbrod |
| 4,361,661 A | * | 11/1982 | Jackson ..................... 523/442 |
| 4,374,672 A | * | 2/1983 | Funston et al. ............. 106/706 |
| 4,406,548 A | | 9/1983 | Haws |
| 4,482,271 A | * | 11/1984 | Mitchell et al. ............ 405/157 |
| 4,624,575 A | | 11/1986 | Lantz |
| 4,781,466 A | | 11/1988 | Zimmerman |
| 5,106,422 A | | 4/1992 | Bennett et al. |
| 5,433,519 A | | 7/1995 | Irsch |
| 5,433,520 A | | 7/1995 | Adams |
| 5,605,397 A | | 2/1997 | Oberg |
| 5,609,416 A | | 3/1997 | Duckworth |
| 5,694,709 A | * | 12/1997 | Cronk et al. ............... 405/179 |
| 5,709,466 A | | 1/1998 | Weszely |
| 5,716,448 A | * | 2/1998 | Furusawa et al. .......... 106/803 |
| 5,730,523 A | | 3/1998 | Flood |
| 5,865,534 A | | 2/1999 | Hay |
| 5,934,800 A | | 8/1999 | Bonacci |
| 5,951,751 A | * | 9/1999 | Williams et al. ............ 106/706 |

(Continued)

FOREIGN PATENT DOCUMENTS

EP    0199884 A2    1/1987

(Continued)

OTHER PUBLICATIONS

Deepak Parmar & Jan Steinmanis, "Underground Cables Need a Proper Burial", Transmission and Distribution World, http://tdworld.com, Apr. 1, 2003, Prism Business Media Inc., Overland Park, KS.

(Continued)

*Primary Examiner*—Frederick L Lagman
(74) *Attorney, Agent, or Firm*—Strategic Patents, P.C.

(57) ABSTRACT

The invention includes a method of making and using a flowable thermal backfill. The flowable thermal backfill has a low thermal resistivity, useful for filling trenches containing electrical cables and other lines that generate heat. The method includes process steps of blending ingredients of stone, sand and fly ash, making a flowable thermal fill by mixing the blended stone, sand and fly ash with Portland cement and water, and pouring the flowable thermal fill in an excavation containing heat generating lines, immediately after mixing the flowable thermal backfill.

24 Claims, 5 Drawing Sheets

U.S. PATENT DOCUMENTS

| | | | |
|---|---|---|---|
| 6,123,445 A | 9/2000 | Grassi | |
| 6,357,905 B1 | 3/2002 | Birchard | |
| 6,527,428 B2 | 3/2003 | Guntert, Jr. | |
| 6,644,891 B2 * | 11/2003 | Caslini et al. | 405/179 |
| 6,666,573 B2 | 12/2003 | Grassi | |
| 6,698,993 B2 | 3/2004 | Stephens | |
| 6,876,904 B2 | 4/2005 | Oberg | |
| 6,971,783 B2 | 12/2005 | Owen | |
| 7,067,004 B2 * | 6/2006 | Matula et al. | 106/803 |
| 2002/0044836 A1 * | 4/2002 | Caslini et al. | 405/179 |
| 2003/0142579 A1 | 7/2003 | Throop | |
| 2004/0037652 A1 | 2/2004 | Schmidmaier | |
| 2004/0184346 A1 | 9/2004 | Fisher | |
| 2004/0218462 A1 | 11/2004 | Stephens | |
| 2005/0018531 A1 | 1/2005 | Hong | |
| 2005/0213424 A1 | 9/2005 | Peterhans | |
| 2005/0219939 A1 | 10/2005 | Christenson | |
| 2005/0219941 A1 | 10/2005 | Christenson | |
| 2006/0007775 A1 | 1/2006 | Dean | |

FOREIGN PATENT DOCUMENTS

| | | |
|---|---|---|
| EP | 0470829 B1 | 4/1995 |
| EP | 1053088 B1 | 2/2004 |
| GB | 2390089 A | 12/2003 |
| WO | WO 9628290 A1 | 9/1996 |
| WO | WO 0224425 A1 | 3/2002 |
| WO | WO 2004/092091 A2 | 4/2005 |

OTHER PUBLICATIONS

Anders, George J., "Application of Thermal Backfills for Cables Crossing Unfavorable Thermal Environments", In: *Rating of Electric Power Cables in Unfavorable Thermal Environments* (*The Institute of Electrical and Electronics Engineers*), (2004), 165-210.

Adams, John I., et al., "The Thermal Behavior of Cable Backfill Materials", *IEEE Transactions on Power Apparatus and Systems* (vol. pas-87, No. 4), (Apr. 1968), 1149-1161.

* cited by examiner

METHOD OF MANUFACTURE AND INSTALLATION FLOWABLE THERMAL BACKFILLS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2006 P&P Quick-Sett Services, Inc.

CROSS REFERENCE TO RELATED APPLICATIONS

None

FIELD OF THE INVENTION

The present invention relates to methods of backfilling trenches. More specifically, the present invention relates to methods for backfilling trenches containing underground electric transmission and distribution lines, and underground telecommunications lines.

BACKGROUND OF THE INVENTION

Installation of underground electric transmission and distribution systems, including those for windfarms, involves digging a trench, laying cable, pipe or conduit (through which cable will be housed), and then backfilling the trench. The backfill surrounding a cable, pipe or conduit must provide a low thermal resistivity (usually less than 100° C.-cm/W at 0% moisture), and must have enough strength to support loading at the surface.

Thermal resistivity relates to the ability of a material to conduct heat. Thermal resistivity is a measure of the ability of a material to impede the flow of heat.

Thermal resistivity (Rho) is typically given in units of (° C.)(T)/W, where ° C. is temperature, T equals a thickness of a material, and W equals the power flowing through the material in Watts. The lower the thermal resistivity of a material, the greater the ability of a material to absorb and transfer heat.

Underground electrical and transmission systems can generated substantial amounts of heat. Heat generated from such underground electrical cables must dissipate quickly and efficiently to allow the cable to operate at or above its design ampacity. If this heat is not dissipated quickly and efficiently, then the amount of current a line can safely carry (ampacity) is substantially reduced. If a line gets overheated, then the line can prematurely fail or a backfire can start.

All heat generated by underground power cables needs to be dissipated through the soil. Underground electrical systems are often designed to last 30 years, and designed, in part, based on the thermal resistivity of the soil. Selecting an good thermal backfill becomes very important for several reasons. Heat generated from a power cable can dry out a surrounding soil completely. The cost of removing and replacing poor backfills is high, especially on paved roads. Electrical demand generally increases with time.

Thus, thermal conductivity of a trench backfill material is key aspect of a fully effective buried electrical system that factors into the design of such systems. Design ampacity of a planned electrical system can be limited by the thermal resistivity a backfill material, and the quality of the backfill has a direct bearing on the life and performance of a buried cable.

There are various designs specified for backfilling a trench containing electric cables. These depend on thermal and other properties of the surrounding soils, loading at trench surface, desired cable ampacity, cable type, arrangement of cables, etc. Many of these trench designs specify using specific backfill materials, alone or in combination. These backfill materials include thermal concrete, Fluidized Thermal Backfill (FTB™), and controlled density fill (CDF). Other materials includes gravels and native soils.

Many of these electrical cables are installed within the roadway right-of-way, and thus it is advantageous that these backfill materials harden quickly enough to pave over within a short time of installation so that steel plates do not have to be used, and so that the public is able to safely use the roadway with the least disruption possible.

DESCRIPTION OF PRIOR ART

Traditional backfill methods include replacing a trench with sand or granular material, and compacting the fill. Vertical compaction is difficult to accomplish, even under the best circumstances. Variables such as mineral quality, gradation, and moisture content complicate matters. This backfill method results in compositions with less-than maximum density and thermal stability. There are often air or honeycomb pockets that create potential hot spots. When more than one cable shares the same trench mutual heating multiplies the problem. Native soil variations can also cause problems when used as a backfill. Fine sands, while moist, provide low thermal resistivity, but when power lines are continuously loaded, the heat generated drys the sands completely. When dried, fine sand backfills are very poor thermal backfills.

Concrete has also been used as a thermal backfill material. Concrete is better at reducing void spaces, but once hardened it is difficult to excavate for repairs. There also exists foam concrete for backfilling, but foam concrete leaves many void spaces giving this backfill a high thermal resistivity, and thus undesirable for backfilling trenches with electrical and transmission lines.

FTB is an improvement to thermal backfills. FTB is a slurry backfill consisting of medium aggregate, sand, a small amount of cement, water and a fluidizing agent. Component proportions are usually chosen by laboratory testing of trial mixes to minimize thermal resistivity and maximize flow without segregating the components. FTBs are formulated to meet thermal resistivity, thermal stability, strength and flow criteria. FTBs do not need to be compacted.

Thermal concretes and FTBs are supplied using a "Ready-Mix" method. "Ready-mix" concrete manufacturing, involves mixing of sand, stone, fly ash, water and Portland cement all at once in a drum mixer at a fixed location. Usually cement and water are mixed first, and then sand and aggregates are added. The mix must then be transported to a job site, usually with a drum mixer. The mix is then transported (for up to 1.5 hours) to the job site.

The disadvantage of the Ready-mix method for manufacturing FTB is that during the time it takes to transport FTB to a job site, water has been fully absorbed into the aggregates creating a thicker paste. With a thicker paste it is more difficult for the FTB to quickly surround cables. Also, ready-mix thermal and standard concretes do not set up fast enough to place other backfills or pavement layers immediately. This means that steel road plates need to be applied to cover a trench, and the trench cannot be opened to traffic immediately.

There are attempts decrease set up time by decreasing water content to pour a "dry" mix, but this reduces the flowability such that the mix can not flow around the cables and conduits adequately to fill all voids—which ultimately compromises the integrity of the transmission line. Either additional Portland cement must be added (resulting a final mix that cannot be excavated with a hand shovel or excavator), or the water content decreased (reducing the flowability such that the mix can't fill all voids).

Another disadvantage of the ready-mix method is that temporary paving is placed on backfill produced by Ready-mix manufacturing because such backfills continue to settle and deform after placement and loading. This results in deformation and cracking of the pavement, and it is for that reason temporary paving is used with Ready-mix operations. This temporary paving must be removed at a later date and permanent base applied, creating wasted resources and labor. In attempts to gain strength immediately, the Ready-mix method often adds more Portland cement to the backfill. More cement only results in an FTB or CDF backfill that is too strong to excavate. If the mix is poured 'dry', the thermal resistivity will not be low enough because maximum density cannot be achieved and the material will not be able to flow smoothly around the cable creating air voids (which act as insulators).

What is needed, therefore, is a method for manufacturing thermal backfills with low thermal resistivity, that quickly set, and that can be varied in strength and provide for immediate paving

BRIEF SUMMARY OF THE INVENTION

The present invention provides a process for producing flowable thermal backfills, used for burying electrical lines, or any pipe, conduit, or utility that generates heat. Uses include city and urban line installation, underground cross-country installation, and windfarm installation. The process includes pre-blending dry ingredients of sand, stone, fly ash and any thermal additives, such as ground silica, to create a homogeneous mixture. This mixture is transported to an installation location/job site. At the installation site-and at the time of installation-water and Portland cement are mixed with the pre-blended dry ingredients to create a flowable backfill. This flowable backfill is installed in a trench containing utilities that generate heat. The backfill is installed at the time water and Portland cement are added to the blended dry ingredients. Preferably, a mobile mixer is used for mixing and installing this backfill at a job site.

Sufficient water is added to create a mix that readily flows into a trench filling all voids. High water contents also allows aggregate particles to completely settle producing a dense mix. Only a portion of water added is required to react with Portland cement and fly ash. Because water is not added until at the time of installation, excess water required for flowability is not absorbed into the aggregates and thus does not create a thick, viscous paste. Rather, enough water remains free, dissociated from aggregates, such that aggregates are able to readily settle into a highly dense matrix. This allows excess water, not needed for reaction with Portland cement and fly ash, to more easily drain off into surrounding soils or evaporate. These high densities produce maximum particle-to-particle contact resulting in high heat conductivity (low thermal resistivity) and strength. The invention achieves required densities quickly. This yields consistent low thermal resistivity and ability to receive loading immediately.

If electrical cable is laid in a roadway, manufacturing and installing thermal backfill according to the invention allows for permanent, rather than temporary, base asphalt paving to be applied immediately. After thermal backfill is installed in a trench up to grade, permanent base asphalt can be installed within 15-60 minutes, and opened up to traffic that day. The day after permanent base application, an upper portion of the permanent base can be milled. Staggered milling preparation eliminates direct paths for water infiltration through joints, and provides a better grip for a new surface inlay. A tack coat and rubber seal are applied to the milled surface, and then a surface course asphalt is inlaid. The roadway can then be reopened to traffic.

FEATURES AND ADVANTAGES

The method of manufacturing and installing flowable thermal backfills according to the present invention results in a self-leveling, self-tamping mix that eliminates vibratory tools and compaction equipment. The method is able to provide a product that meets mix designs such that low strength, making excavation easy, is balanced with low thermal resistivity. An advantage of mixing backfills at a job site and at the time of installation is that there is no wasted material. If there are delays in trenching or laying cable, there are no ready-mix concrete delivery trucks that need to unload their mix.

The fluidized state of the material encases the diameter of the cables eliminating air or honeycomb pockets that will create potential hot spots. This provides continuity to thermal resistivity assuring quality control during installation. This also provides backfills that dissipate heat quickly and efficiently allowing a cable to operate at or above its design ampacity. The consistently low thermal resistivity means that trenches can be cut narrower reducing excavation cost by up to 25% or more.

Thermal concrete and fluidized thermal backfill installed according to the present invention has a very low thermal resistivity even when totally dry, and has very long thermal dry out times. This creates an extremely stable thermal environment with predictable thermal Rho. The thermal concrete and fluidized thermal backfill is not responsive to weather conditions and can be installed in rain or inclement weather without compromising quality. Such backfills also guard against frost heaves by eliminating channels where water can collect and freeze. Yet such backfills provide sufficient permeability to eliminate water dams often associated with controlled density fills.

The invention allows designing FTBs and CDFs with a strength less than 200-psi at 90-days. This makes excavation possible by hand-shovel or excavator for future service or emergency repair.

Thermal backfills installed according to the invention do not settle or deform, under a load, once placed. The ability to pave immediately increases trenching production. The conventional method of pavement restoration is to place temporary paving, wait for 30 days or longer to allow the trench to settle, then remove and dispose of the temporary paving, and re-pave with permanent paving.

Providing immediate paving after installation dramatically increases productivity and reduces associated costs. Police details and their expenses are minimized. Insurance premiums are less when steel plates are not used. Plates can move out of place creating safety hazards for vehicles. Open trenches can also create pedestrian safety hazards. By eliminating plates, vehicular and pedestrian insurance premiums are significantly reduced because the trench is opened, backfilled and paved in the same day. A potential for OSHA violations is also reduced because the trench is exposed far less time, and the heavy, hard to handle steel plates are eliminated.

BRIEF DESCRIPTION OF THE DRAWINGS

In the drawings, closely related figures and items have the same number but different alphabetic suffixes. Processes, states, statuses, and databases are named for their respective functions.

FIGS. 6a-7b show diagrams for pavement restoration in a trench.

DETAILED DESCRIPTION OF THE INVENTION, INCLUDING THE PREFERRED EMBODIMENT

Terminology

Flowable thermal fill—Any backfill in slurry form that has low thermal resistivity. Such a backfill is comprised of at least aggregate, water, and cement, and preferably includes stone. Such backfills include thermal concrete, fluidized thermal backfill, controlled density fills that have low thermal resistivity.

At the time of installation—means that Portland cement and water are added and mixed less than 10 minutes before pouring, and preferably seconds before pouring or as a mix is poured.

Heat generating lines"—means any pipe, cable, conduit, wire or heat generating utility or structure that is buried underground or in a trench or can be covered, and for which heat dissipation is beneficial. Such lines generally transmit electricity, but can also include data transmission lines.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

Figure 1A:
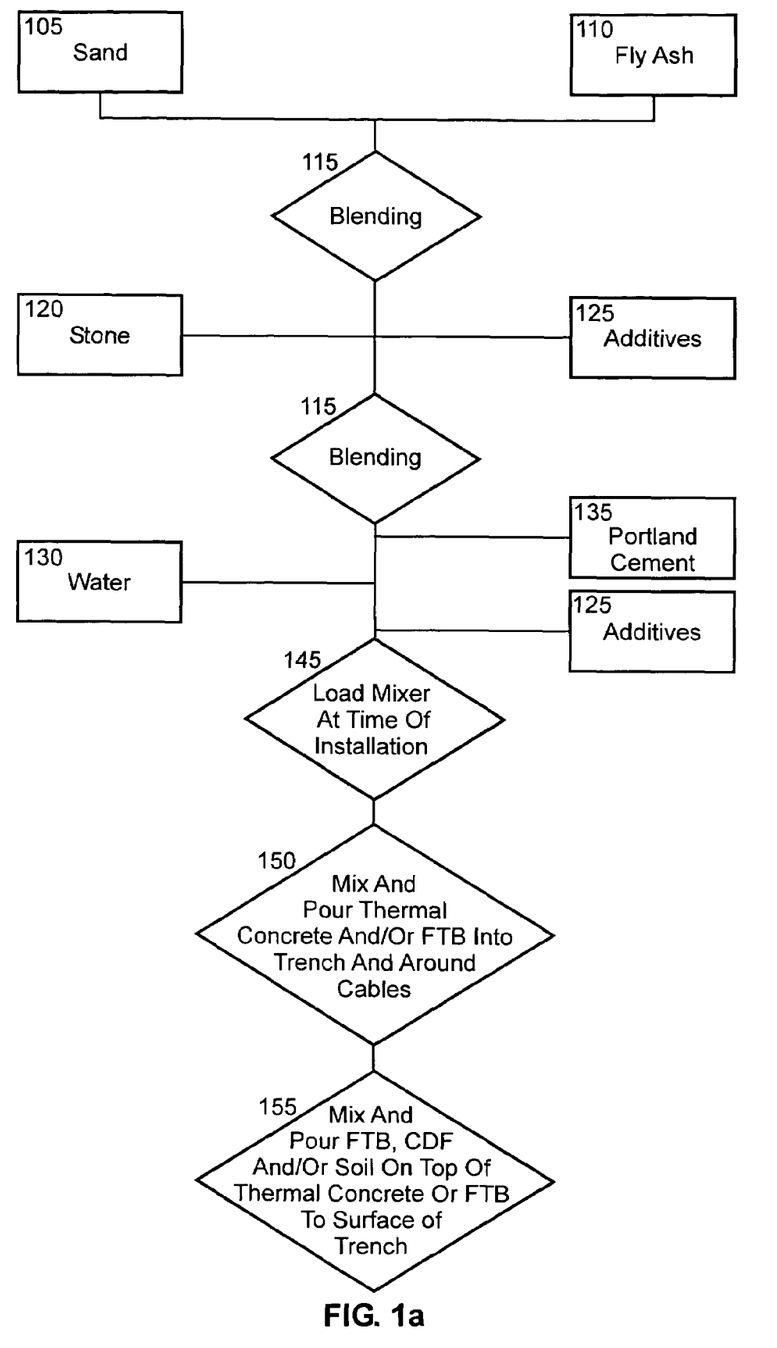
FIG. 1a is a flow chart of the overall process of the invention.

Referring to FIG. 1a, a flowchart outlines the process for manufacturing and installing thermal concrete, FTB, and CDF. First, sand 105, fly ash 110 are blended (115). Stone 120 and any additives 125 specified by a mix are blended created a blend of dry ingredients. Such dry ingredients should have a moisture content less than about 20%, and preferably less than 10%. At the time of installation, a mixer is loaded (145) with the blended dry ingredients, Portland cement 135, water 130, and any other specified additives 125. Mixing these ingredients creates a flowable thermal backfill which is then poured into a trench and around cables (150). Flowable thermal backfills are preferably poured within seconds of being mixed, but may be poured up to about 10 minutes after being mixed. If a trench is filled in layers, a second type of flowable thermal backfill, and/or a soil is filled in the trench to bring the fill to the surface (155).

Figure 1B:
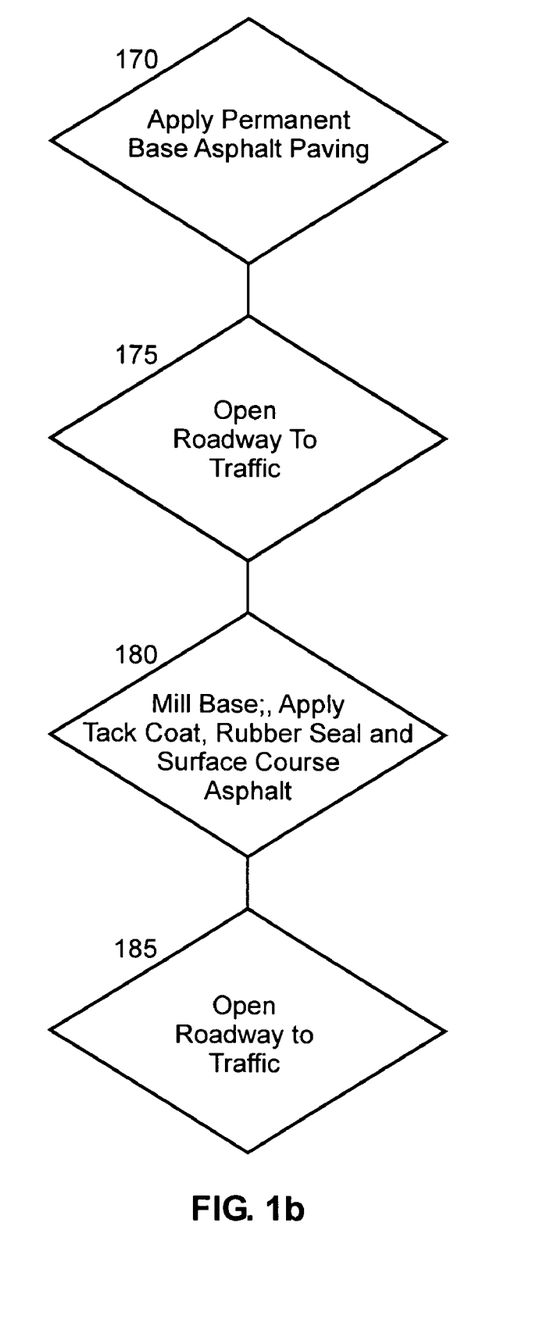
FIG. 1b is a flow chart of the pavement restoration process.

FIG 1b shows permanent asphalt base paving for the installation of underground electric transmission and distribution systems. After a flowable thermal backfill fills a trench to a specified grade, permanent base asphalt paving can be applied (170).

Depending on the type of flowable backfill, permanent base asphalt paving can be applied in as little as 15 minutes to 60 minutes after pouring the flowable backfill.

With asphalt is place, a roadway can be opened to traffic (175). In the following day, a portion of the permanent base asphalt can be milled (180) to apply a surface course asphalt, after which the roadway can be again opened to traffic (185).

There are several materials involved in the manufacture and installation of thermal backfills. The following is a list of the component materials:

Stone—Preferably, the invention uses stone with maximum particle size of ⅜". Maximum size, however, depends on (1) conduit or cable spacing in a trench, and (2) ability to achieve a grain-size distribution of the blended materials that produces an acceptable thermal resistivity (Rho). The type of stone used depends heavily on particular mineral types. Quartz, dolomite, limestone, etc., are some of the minerals that conduct heat particularly well.

Sand—Sand meeting requirements for use in standard concrete manufacture is acceptable, and the maximum grain-size is typically ¼ inch. Sands with other gradations may be used if the resulting blend of materials produces a grain-size distribution specified by a particular job. Sand used also depends heavily on a particular mineral type. Quartz, dolomite, limestone, etc. are some of the minerals that conduct heat particularly well.

Fly Ash—Fly ash is a fine, powdery residue resulting from the combustion of ground or powdered coal. Fly ash can be used in wet or dry form for this process. Fly ash affects grain size distribution, flowability, and long-term strength of a concrete mix.

Portland Cement—A cement that consists of mixture of oxides of calcium, silicon and aluminium. There are several types of Portland cement having variations in ingredients, properties and strength. Preferably, type I/II Portland cement is used in the present invention.

Water—Water meeting specifications for standard concrete production is used. Water amount affects flowability, both long and short-term strength, and density achieved during installation. Water can be heated during cold weather pouring (below 40 degrees Fahrenheit.

Additives—Other additives may be combined in a backfill mix to achieve lower than normal thermal resistivity (e.g., <50° C.-cm/W). Additives may also be combined if aggregates native to a particular area do not have adequate thermal properties. Such additives include natural minerals such as ground silica.

For a mix design, a series of different blends of materials are made and tested for thermal resistivity, compressive strength and other parameters, according a project's objectives, to determine which blend(s) best meets project performance specifications and which is most economical to produce. Mixes are typically designed on a dry-weight basis so that water content is appropriately accounted for in the mix. In one embodiment, an on-site production system can manufacture and install mix designs from all virgin aggregates brought onto a site to meet stringent thermal parameters for manufacturing FTB from existing soils.

There are numerous mix designs that can be created. Mix designs are based on the site requirements for a thermal backfill. Thermal concrete and FTB typically consist of sand, stone, fly ash, Portland cement, and water. FTB and thermal concrete, and CDF are all heavy on water compared to standard concrete mixes. Other additives can be included to further reduce thermal resistivity. CDF typically consists of same ingredients as FTB except for stone. CDF is not required to have the low thermal resistivity properties of an FTB or thermal concrete, but should have the same immediate strength-gain properties as the thermal mixes. Mr. Scola determined that by pre-blending the sand, stone, fly ash and additives (if necessary) followed by use of a mobile mixer for adding Portland cement, water and additives (if necessary) at the time of installation, the high density required for low thermal resistivity and immediate strength could be achieved. This has been demonstrated to be consistently far superior to existing technology for providing thermal concrete, FTB and CDF for underground electric transmission and distribution systems.

Enough water must be added to produce slumps of about 6-inches for thermal concrete and about 9-inches for FTB, as measured by ASTM C 143. These high slumps are required so that the mixes readily flow into a trench filling all voids and fully encasing the cables.

There are several pieces of manufacturing equipment that can be used to make the backfilling manufacture and installation process more efficient. Such equipment includes:

Loader—Front-end loaders or backhoes are used for "layer-cake, bucket" blending of ingredient materials (stone, fly ash and sand). Loaders also feed double-auger pugmills with ingredient materials, and load blended ingredient materials into mobile mixers.

Cement Silo—Cement silos house Portland cement so that it is kept dry. Such silos allow mobile mixers to be loaded with Portland cement by gravity feeding.

Double-Auger Pugmill—A two to three hopper pugmill is often used for blending stone, fly ash and sand. Each hopper is loaded with a different ingredient material.

Ingredients are then blended in the double auger. The resultant blend can be stockpiled for loading into mobile mixers.

Mobile Mixer—Mobile mixers mix the resultant blend (stone, sand, fly ash), water and Portland cement at an installation site.

Compactor/Roller—Typically, one to two ton rollers are used for compacting asphalt when trenches are dug in roadways, but any size roller could be used. Rollers are used to compact soil or asphalt.

Milling Machine—A milling machine is used to mill down a asphalt base course for asphalt surface course application.

Before FTB or thermal concrete can be installed, the ingredients of stone, sand and fly ash must first be homogeneously blended. There are many methods for pre-blending aggregates. Two of the preferred methods of blending are described below. Often times blending methods are combined in series.

In all cases, moisture content of ingredient materials must be determined so that ingredient materials can be blended on a dry-weight basis according to a mix design. Mositure content can be determined by using American Society for Testing and Materials (ASTM) test C 566, Standard Test Method for Total Evaporable Moisture Content of Aggregate by Drying. When blending volumetrically, unit weights of materials are determined to convert from volume to weight. Unit weight can be determined using test ASTM C 29, Test Method for Unit Weight and Voids in Aggregates.

One method of pre-blending is "Layer-Cake, Bucket" blending. In layer-cake, bucket blending, sand, stone and fly ash are spread out in layers on top of one another creating a "layer-cake". A front-end loader, backhoe or similar device digs into the layer-cake and mixes the materials thoroughly. Alternatively, the layer-cake may be fed into a double-auger or other mixing device for homogeneous blending. Also, sand may first be blended with fly ash by the layer-cake, bucket method, and then blended with stone using the double-auger method.

Figure 2A:
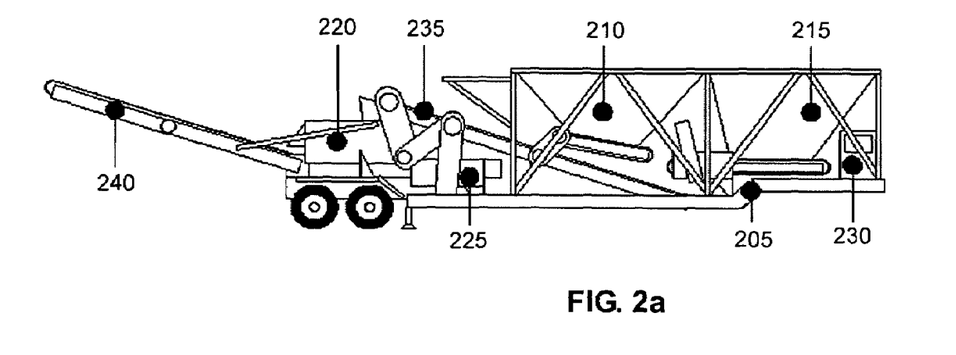
FIGS. 2a-2c show equipment used to manufacture and install flowable thermal backfills.

Another method of pre-blending is double-auger blending. FIG. 2a shows a pugmill that includes frame 205, first hopper 210, second hopper 215, double-auger mixing chamber 220, first engine 225, second engine 230, first conveyor belt 235, and output belt 240. Dry materials are loaded into hoppers 210 and 215. Gates on each hopper are set to deliver the appropriate amount of material such that a mix design is met. Each hopper discharges materials onto conveyor belt 235 that passes the materials into double-auger mixing chamber 220 to be blended. Double-auger mixing chamber 220 blends stone, sand and fly ash. The composite blend can be stockpiled for later use. Alternatively, sand and fly ash can be blended by the double-auger mixer first, and then fed back into the pugmill to be blended with stone.

If a two-hopper double-auger mixer is used, then the sand/fly ash blend can be produced by the layer-cake, bucket method and placed in one hopper of the double-auger mixer. Stone is placed in the second hopper. Preferably, a three hopper mixer is used whereby each of the three materials is placed in individual hoppers. Fly ash can be fed in dry form directly into a double-auger mixing chamber from a silo above, such that sand is added to one hopper and stone to a second hopper. Any method of blending aggregates can be used, with the present invention, that results in a homogeneous mixture.

Quality Control of the process is important. At each step of process for blending stone, sand and fly ash, representative samples should be secured to ensure blends meet ratios defined by a mix design. Sampling can be conducted according to ASTM D 75, Standard Practice for Sampling Aggregates. Blends are tested for grain-size distribution to ensure a mix design is met. Moisture content is also determined so that a blend may be combined with Portland cement and water in appropriate amounts on a dry-weight basis in a mobile mixer.

Alternatively, pre-testing can be used. Standard operations do not test their product for thermal resistivity as part of their Quality Control system. Testing is done by a 3rd-party after the product has been poured. Thermal results are typically not obtained until weeks or months later. If a material does not pass requirements, then a trench with cable and conduit must be dug up. Thermal resistivity pre-testing enables testing a product on a regular basis before it goes in a trench. Such pre-testing guarantees specifications are met ahead of time.

By testing a product ahead of time, a manufacturer can confirm thermal resistivity of a material will meet specifications before the material goes into a trench. Such pre-testing adds confidence to the operation, and reduces liability.

Figure 2B:
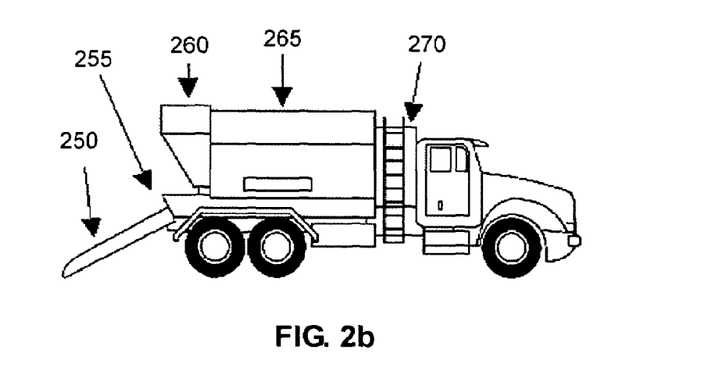
Figure 2C:
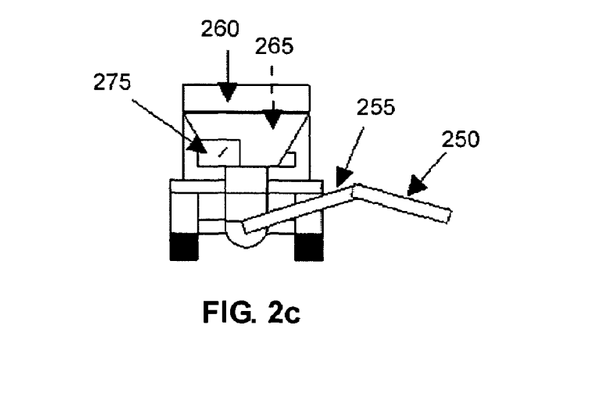

Mobile mixers are available commercially. Mobile mixers can be of a type that mixes ingredients by weight or by volume. Mobile mixers generally have several different containers for carrying ingredients to make concrete. In the preferred embodiment of the invention, a mobile volumetric mixer is used. Referring to FIGS. 2b-2c, such a preferred mobile mixer has one or two aggregate hoppers 265, water tank 270, Portland cement hopper 260, and a mixing auger chamber 255, distribution chute 250, and control unit 275.

A mobile volumetric mixer has controls for adjusting an amount of aggregate and other ingredients delivered to the mixing auger. A mobile mixer is loaded with the sand/fly ash/stone blend, Portland cement, water, and any other additives called out by a particular thermal backfill mix design.

Each mobile mixer is calibrated in accordance to a manufacturers' specifications, and adjusted to provide a product meeting a mix design. Typically, a mobile mixer is calibrated so that it can deliver cement at a lean setting for FTB or CDF production, and at a full setting for thermal concrete production using the same sand/fly ash/stone content with requisite adjustment of water content.

At the time of manufacture and installation, a manufacturing supervisor or foreman visually inspects a mobile mixer ensure that hoppers for Portland cement, water and pre-blended aggregates are adequately filled. The supervisor checks to see that equipment is in working order, and that levers and gates for ingredients are at correct settings for a mix design. The supervisor attaches an appropriate number of extension chutes, and positions and readies the mobile mixer for pouring.

After trenching and conduit/cable installation, a manufacturing supervisor/foreman engages the mobile mixer system, and begins product manufacture. It is important to continually observe the mix for homogeneity, consistency and flowability (or "slump"). Upon observation that the mix is not being produced to specification, he stops production immediately.

Figure 3A:
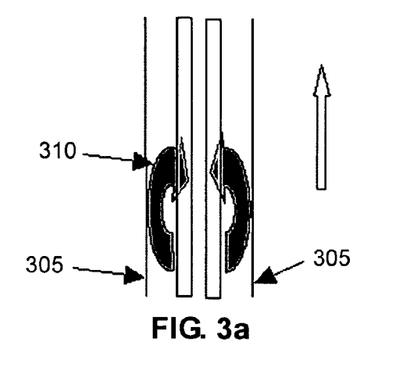
FIGS. 3a-3b are diagrams showing installation of flowable thermal backfills.
Figure 3B:
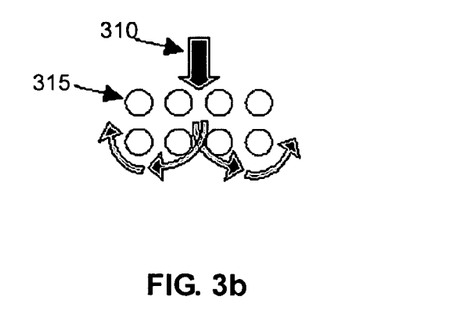

Referring now to FIG. 3a, thermal backfills are generally poured to the sides of the conduits and cables. In trench 310, flow of concrete 315 is poured to the side of cables. Thermal backfills are also poured (315) in between cables 320 if there are more than one cable in a particular electrical system (FIG. 3b). Pouring directly on cables is avoided. Flowability, or "slump" is continually monitored to ensure that the thermal backfill flows such that 100 percent continuity of mix in the trench is achieved, i.e., so that no air pockets are formed and cables are fully encapsulated. Pouring continues and the level of mix in a trench gradually rises up from the bottom. As the thermal mix rises, it flows around cables from below and meets at the top of cables so that cables are fully surrounded. The thermal backfill mix is poured until it reaches a level above the cables specified by a particular trench design.

Figure 4A:
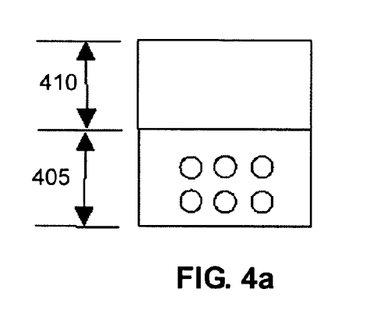
FIGS. 4a-4b show two designs used to fill trenches containing electrical cables.
Figure 4B:
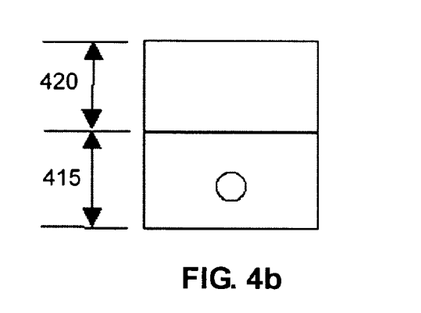

Depending on trench design specifications, a specific type of thermal mix can fill an entire trench or only a portion thereof. It is common for a first type of flowable thermal backfill to surround and cover electrical lines, while a second type of flowable thermal backfill is used to fill the remainder of a trench. Gravel or native soil is an option for filling the remainder of a trench. After pouring a first layer of thermal backfill, tape marking the electrical cable can be rolled onto fresh mix. Within five to fifteen minutes, a second layer of material can be poured. If thermal concrete 405 was laid first, then FTB, CDF, gravel or soil 410 (depending on project specifications) is applied to bring the level up to grade (FIG. 4a). If FTB 415 was laid first, then CDF, gravel or soil 420 is applied to bring the level up to grade (FIG. 4b).

Flowability of a thermal mix coming off a chute from a mobile mixer may be adjusted slightly by varying the water added to the mix. If there is standing water in a trench, then the amount of water added to a mix may be reduced such that when the mix is poured it combines with the standing water producing the desired mix.

Figure 5A:
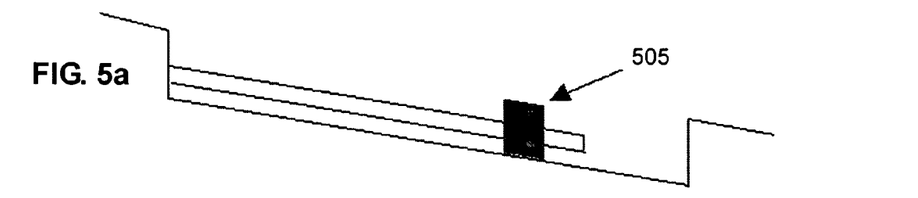
FIGS. 5a-5b show an installation technique.
Figure 5B:
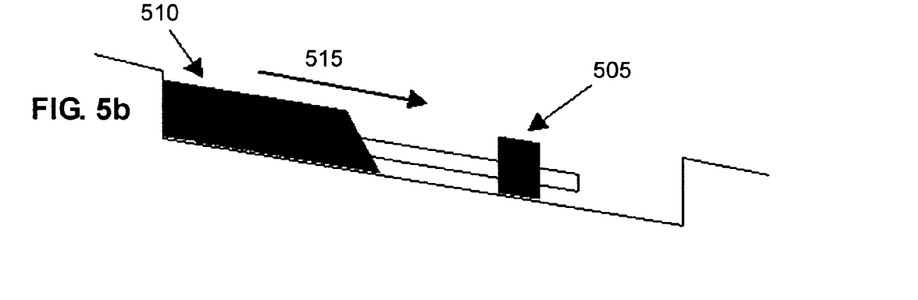
Figure 6A:
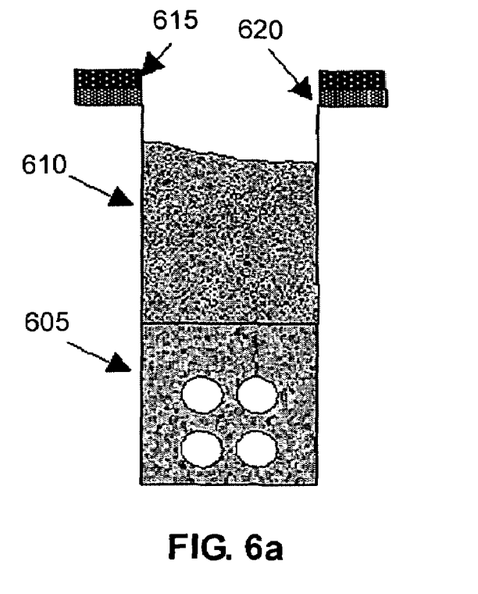
Figure 6B:
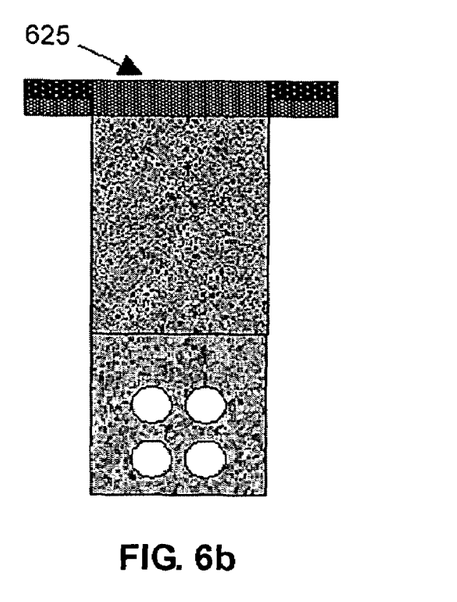

Referring to FIGS. 5a-5b, when work, such as trenching and cable laying needs to continue at one end of a trench while pouring is conducted at the other end, excess water draining out from a mix can be reduced. In this case, a small section of mix with low flowability (and thus low water content) is placed down-stream from the pouring area forming a Dry Wall barrier 505. Mix with normal flowability 510 is then poured up stream as the mix flows (515) toward dry wall barrier 505.

Samples of fresh thermal mix (uncured, unhardened) are secured from the end of an installation chute during production. Samples can be secured according to ASTM D5971/C172, Standard Practice for Sampling Freshly Mixed Controlled Low-Strength Material. The sampling receptacle (e.g., a five-gallon pail) is passed through the entire width of mix exiting the chute. Enough material is secured to conduct fresh mix testing and make cylinders. Typical specified sampling rates are once per 50 or 100 cubic yards of mix placed.

Samples are taken to a location at which cylinders (for eventual compressive strength testing) will be made, and short-term cured (e.g., >four days for FTB and one to two days for thermal concrete). This is typically within a short distance from the pour site. Testing and cylinder production are generally not conducted at time limits greater than stipulated in ASTM standards.

Based on trench project specifications, fresh mixes are typically tested for slump or flow (ASTM C143 or D6103), air content (ASTM C231), temperature (ASTM C1064), and unit weight (ASTM D6023). Testing is conducted within time limits stipulated by these ASTM methods. Results are compared with project specifications and targeted mix design values.

Cylinders can then be made according to ASTM D4832/C31 for subsequent testing of the hardened mix. Cylinder production is conducted within time limits stipulated by applicable ASTM methods listed above. Cylinders are short term stored at 60-80 degrees Fahrenheit, at an area where they were produced. For FTB, cylinders may be moved after four days of short-term curing to a laboratory where they are long term cured according to ASTM specifications. For thermal concrete, cylinders may be moved to a laboratory after two days of short-term curing.

Cylinders of hardened mix can be tested for thermal resistivity according to IEEE Standards. Cylinders can also be tested for compressive strength at various cure times (e.g., 7 and 28 days) according to ASTM C39/D4832. Results are compared with project specifications and targeted mix design values.

Referring now to FIGS. 6a-7b, the present invention provides for quick pavement restoration. Because thermal concrete, FTB and CDF gain strength so quickly, permanent base asphalt paving can be applied and compacted after 15 minutes from pouring. Thermal concrete or FTB 605 encapsulates cables. FTB or CDF 610 fills a trench to paving grade which is generally near the bottom of existing base asphalt 620. Permanent base asphalt 625 is applied over FTB or CDF 610 to meet existing surface course asphalt 615. Paving can be applied with standard self-propelled paving equipment or by hand. Typically a roller is used for compaction. Roadways can be re-opened to traffic after base asphalt application.

Figure 7A:
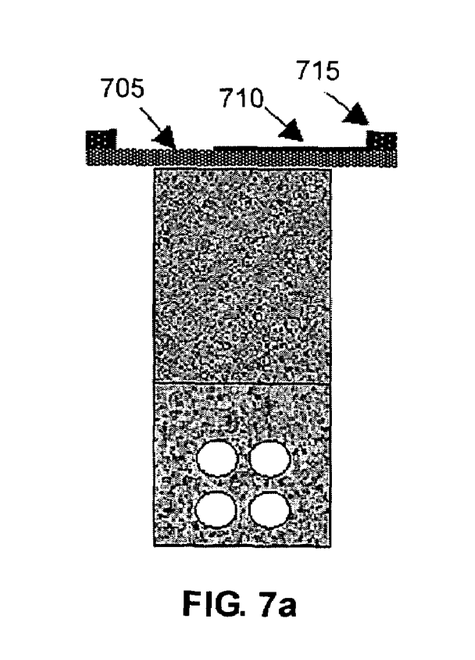
Figure 7B:
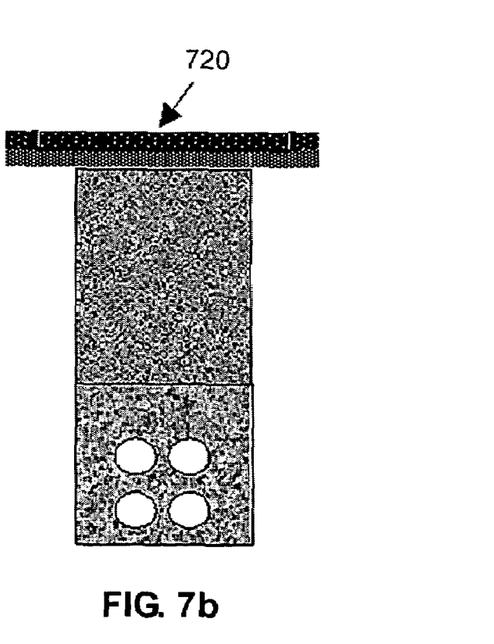

Final asphalt paving can be placed a day after trench restoration and base asphalt application. The day after permanent base application, milling machines remove the upper 1-2" of base course and at least 6" inches either side of the trench cut (705). Such milling is done so that when a surface course is installed, the surface coat will distribute traffic loading over the base course joint, in the same way brick masons stagger joints on a brick wall. Such inlay also eliminates a direct path for water infiltration through the joint. In addition, a rough milled surface works like tiny mortise and tendon connections gripping a new surface paving inlay.

Prior to paving, an RS-1 emulsion tack coat 710 is applied on the entire milled surface ensuring a quality bond with the permanent asphalt inlay. A hot rubber seal 715 is then placed on an edge of the joint as a further barrier against water penetration. Lastly, asphalt surface course in-lay 720 is applied, and the roadway re-opened to traffic.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A method of making and using a flowable thermal fill, the method comprising:
    blending dry ingredients of at least sand and fly ash, thereby forming a blend of dry ingredients;
    making a flowable thermal fill by mixing the blend of dry ingredients with cement and water immediately before pouring the flowable thermal fill; and
    pouring the flowable thermal fill, in an excavation containing heat generating lines, immediately after making the flowable thermal fill.

2. The method of claim 1, wherein said blend of dry ingredients includes stone.

3. The method of claim 1, wherein the flowable thermal fill is mixed in a mobile mixer.

4. The method of claim 1, wherein the flowable thermal fill is poured within one minute of being made.

5. The method of claim 1, further comprising filling the excavation to a specified level with the flowable thermal fill.

6. The method of claim 1, further comprising continuously making and pouring the flowable thermal fill.

7. The method of claim 1, wherein the flowable thermal fill is poured within one minute of being made.

8. A method of manufacturing and installing thermal concrete and fluidized thermal backfill, the method comprising:
    homogeneously blending stone, sand, and fly ash to form a substantially homogeneous blend of dry ingredient materials;
    loading the blend of dry ingredient materials into a mobile mixer;
    mixing the blend of dry ingredient materials, Portland cement, and water in the mobile mixer at an installation location at a time of installation to create a flowable thermal fill; and
    installing the flowable thermal fill by pouring the flowable thermal fill in a trench containing heat generating lines wherein the flowable thermal fill covers the heat generating lines.

9. The method of claim 8, wherein the dry ingredient materials are blended using a pugmill.

10. The method of claim 8, wherein the dry ingredient materials are blended using a layercake, bucket method of blending.

11. The method of claim 8, further comprising storing the homogeneous blend of dry ingredient materials.

12. The method of claim 8, wherein the blended dry ingredient materials include thermally conductive minerals.

13. The method of claim 8, wherein the mobile mixer contains separate storage containers for the blended dry ingredient materials, Portland cement and water.

14. The method of claim 8, further comprising mixing minerals at the time of installation.

15. The method of claim 8, wherein the heat generating lines are electrical power lines.

16. The method of claim 8, wherein the trench is used for wind farm cable lines.

17. The method of claim 8, further comprising, pouring a first type of flowable thermal fill to a specified height above the heat generating lines, and pouring a second type of flowable thermal fill over the first type of flowable thermal fill.

18. The method of claim 8, further comprising, pouring a first type of flowable thermal fill to a specified height above the heat generating lines, and applying a second type of fill over the first type of flowable thermal fill.

19. A method of restoring trenches containing heat generating lines, the method comprising:
    blending dry ingredients of stone, sand, and fly ash thereby forming a blend of dry ingredients;
    loading the blend of dry ingredients into a mobile mixer, said mobile mixer containing separate storage containers for the blended dry ingredients, Portland cement and water;
    mixing the blend of dry ingredients with Portland cement and with water in a mobile volumetric mixer at an installation location at a time of installation to create a flowable thermal fill;
    pouring the flowable thermal fill in a trench containing heat generating lines thereby covering the heat generating lines, wherein said flowable thermal fill is poured shortly after mixing water and Portland cement;
    backfilling the trench with the flowable fill to a specified grade;
    applying a permanent base asphalt paving over the flowable thermal fill;
    milling a portion of the permanent base asphalt paving; and applying a surface coarse asphalt in the milled portion of the permanent base asphalt.

20. The method of claim 19, further comprising blending minerals with the dry ingredients.

21. The method of claim 19, further comprising storing the blend of dry ingredients.

22. The method of claim 19, wherein milling is horizontally staggered from a joint.

23. The method of claim 19, further comprising, pouring a first type of flowable thermal backfill to a specified height above the heat generating lines, and pouring a second type of flowable thermal backfill over the first type of flowable thermal backfill.

24. The method of claim 19, further comprising, pouring a first type of flowable thermal backfill to a specified height above the heat generating lines, and applying a second type of backfill over the first type of flowable thermal backfill.

* * * * *